United States Patent
Godsey, Jr.

(10) Patent No.: US 11,505,472 B2
(45) Date of Patent: Nov. 22, 2022

(54) PROCESS TO PROVIDE SOURCE WATER AND MANAGE PRODUCED/FLOWBACK WATER FOR HYDRAULIC FRACTURING

(71) Applicant: Geo Logic Environmental Services, LLC, Kilgore, TX (US)

(72) Inventor: William Eugene Godsey, Jr., Houston, TX (US)

(73) Assignee: Geo Logic Environmental Services, LLC, Kilgore, TX (US)

(*) Notice: Subject to any disclaimer, the term of this patent is extended or adjusted under 35 U.S.C. 154(b) by 604 days.

(21) Appl. No.: 16/533,183

(22) Filed: Aug. 6, 2019

(65) Prior Publication Data

US 2020/0039839 A1    Feb. 6, 2020

Related U.S. Application Data

(60) Provisional application No. 62/714,956, filed on Aug. 6, 2018.

(51) Int. Cl.

| | |
|---|---|
| *E21B 43/02* | (2006.01) |
| *C02F 1/00* | (2006.01) |
| *E21B 41/00* | (2006.01) |
| *C02F 3/00* | (2006.01) |
| *C02F 103/10* | (2006.01) |
| *E21B 43/26* | (2006.01) |

(52) U.S. Cl.
CPC ............... *C02F 1/004* (2013.01); *C02F 1/006* (2013.01); *C02F 3/00* (2013.01); *E21B 41/00* (2013.01); *E21B 41/005* (2013.01); *E21B 43/02* (2013.01); *C02F 2103/10* (2013.01); *E21B 43/26* (2013.01)

(58) Field of Classification Search
CPC ......... E21B 43/02; E21B 41/005; C02F 1/006
See application file for complete search history.

(56) References Cited

U.S. PATENT DOCUMENTS

| | | | | |
|---|---|---|---|---|
| 2,953,204 A | * | 9/1960 | Doscher | E21B 43/20 166/266 |
| 3,670,817 A | * | 6/1972 | Saucier | E21B 43/04 166/278 |
| 4,010,800 A | * | 3/1977 | Terry | E21B 43/243 48/210 |
| 4,299,284 A | * | 11/1981 | Brown | C09K 8/502 166/245 |
| 2016/0096124 A1 | * | 4/2016 | Marco | B01D 29/682 210/411 |

* cited by examiner

*Primary Examiner* — Catherine Loikith
(74) *Attorney, Agent, or Firm* — Loomis, Ewert, Parsley, Davis & Gotting, PC; Mikhail Murshak (57) ABSTRACT

A method and system of providing source water and managing produced/flowback water during a hydraulic fracturing process in an oil and gas operation. The process is an environmentally friendly method of reducing use of fresh water and recycles frac water. The net result is that a volume of frac water is properly managed. Thus, less reliance on transportation vehicles and trucks reduces costs as well as reduction of piping systems. It further reduces a threat of seismic events from disposing of produced water and flowback.

20 Claims, 6 Drawing Sheets

PROCESS TO PROVIDE SOURCE WATER AND MANAGE PRODUCED/FLOWBACK WATER FOR HYDRAULIC FRACTURING

CROSS REFERENCE TO RELATED APPLICATION

This application claims priority to U.S. Provisional Application No. 62/714,956 filed Aug. 6, 2018, which is incorporated herein by reference in its entirety.

TECHNICAL FIELD

The present disclosure relates generally to a system and process fluid and water management associated with hydraulic fracturing or fracking.

DESCRIPTION OF RELATED ART

The oil and gas industry has tremendous demands for water (fresh, brackish and saline) to deliver proppants to stimulate wells and create permeable pathways for oil and gas to move to wells where it can be brought to the surface and produced into a myriad of products. The process is known as hydraulic fracturing or fracking ("frac" or "frack" for short). Conventionally, this water is obtained by a variety of means such as surface water supply, groundwater (fresh, brackish and saline) which is pumped from wells and transported via trucks or piped to the areas where it is needed. This is usually done at a considerable cost to the oil and gas operator. In many cases, this water is not near the areas where the fracking is taking place. This creates a situation where the operator has to rely on multiple subcontractors to deliver the water where it is needed on time for a frac job.

For environmental reasons and cost, the current trend is to reduce the use of potable fresh water and convert to brackish or saline water to frac the wells due to the perceived notion that the oil and gas industry is taking a disproportionate volume of fresh water from surface and groundwater supplies.

Furthermore, the oil and gas operators are also faced with expensive disposal costs to manage the produced water that is generated when the spent frac water fluids are no longer able to be utilized in fracking by either treatment or recycling efforts at the land surface.

Operators and disposal well companies are faced with concerns of seismicity due to the placement of too much water in an area that may be faced with an active fault. Therefore, water sourcing and water management costs for hydraulic fracking are escalating and making production of valuable hydrocarbons more expensive. Increased trucking costs, the danger of trucks loaded with water on the roads, lack of access for pipelines to be laid to transport the fluids are increasingly becoming obstacles to the operator's rights to develop the resources.

Current water treatment technology at the land surface is costly and still leaves residue that must be managed. An environmentally acceptable and cost-effective solution is needed to keep hydraulic fracturing going and maintain a safe and secure supply of hydrocarbons for national security and economic independence for producers.

Systems exist for addressing issues associated with hydraulic fracturing, water sourcing, spent water management and seismic activity. Some of these systems attempt to solve one of these issues, but these systems fail to meet the needs of the industry because they are expensive, incomplete and do not address all of the problems. Other solutions may attempt to solve two of these issues, but these solutions are similarly unable to meet the needs of the industry because they are cost prohibitive and do not address the issue of seismicity. Still other solutions seek to remove trucks from the roads, minimize infrastructure and reduce water use, but these solutions also fail to meet industry needs because they rely on multiple contractors and still fail to address the seismicity issue.

It would be desirable to have a system and a process for hydraulic fracturing which reduced the cost of source water, decreased the cost of managing spent fracking fluids (commonly referred to as "frac fluid"), was environmentally friendly, minimized infrastructure costs and reduced dependency on multiple contractors. Furthermore, it would also be desirable to have a cost effective process that is self-contained and recycles water. Still further, it would be desirable to have a process for reducing use of trucks and disposal wells and eliminating the threat of seismicity. Therefore, there currently exists a need in the industry for a process that provides source water, manages flowback water and eliminates seismicity risk simultaneously, in a cost effective manner.

Despite other attempts to solve the problems associated with existing systems, none of these teach or suggest a material and/or method having the benefits and features of the present disclosure.

SUMMARY

The present disclosure provides for advantageous solutions to solve the aforementioned deficiencies by providing a process to provide source water and manage produced/flowback water associated with hydraulic fracturing.

In an example, an environmentally friendly, filtering, recycling and capture solution is provided that includes at least some of the following components: (a) a source of produced water and flowback with storage (i.e., used frac fluid); (b) an injection well; (c) a porous and permeable filtering sub-surface (i.e., a filtering zone), non-potable water reservoir; (d) one or more recovery wells; (e) pressure monitoring; and (f) a storage/distribution system for recycled water.

A process according to the present disclosure may also include one or more of the following steps to meet specific water quality parameters as specified by a user: (a) a pretreatment to injection step; and (b) a post-recovery treatment step. Other options may include using facilities for truck loading and unloading to allow for water to be brought in or transported out.

A method of the present disclosure can be advantageous in that it helps: (1) minimize water use; (2) minimize waste generation; (3) reduce the number of contractors needed to coordinate; and (4) reduce and/or eliminate seismicity issues.

Further still, in another example of the present disclosure, a method is provided that: (1) uses the subsurface of the Earth, well below the base of usable quality groundwater as a natural filter to provide source water and recycle fluids; (2) reduces the use of chemicals and natural resources (fresh water) in hydraulic fracturing; and (3) eliminates the seismicity hazard by putting water in and taking water out of the same reservoir.

For purposes of summarizing the disclosure, certain aspects, advantages, and novel features of the disclosure have been described herein. It is to be understood that not necessarily all such advantages may be achieved in accordance with any one embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and method(s) of use for the present disclosure constructed and operative according to the teachings of the present disclosure.

The various embodiments of the present disclosure will hereinafter be described in conjunction with the appended drawings, wherein like designations denote like elements.

DETAILED DESCRIPTION

The present disclosure provides for a process for water sourcing and recycling of frac water that would select a reservoir to source fluids, filter and recycle spent fluids and return clean fluid for hydraulic fracturing. This process reduces fresh water usage, reduces a need for tanker trucks on highways, and minimizes or reduces piping and water transportation costs. Still further, a process is provided for lowering hydraulic fracturing costs and eliminating seismic activity from disposal operations. A need exists for a process that selects a suitable formation that can accept frac fluids, filter them and provide clean source water at low cost which minimizes infrastructure and eliminates or reduces seismic events.

The present disclosure is directed to recycling of hydraulic fluid and providing source water and manage produced/flowback water for hydraulic fracturing. In an example, the present disclosure provides for a method including the steps of: (a) providing a source of fluids with a storage system to hold the fluids; (b) treating the fluids in a pre-injection treatment phase; (c) providing an injection well and pumping system to place the fluids in a porous and permeable subsurface reservoir, wherein the injection well is fitted with pressure monitoring equipment that can be monitored remotely; (d) placing recovery wells and pumps in the same subsurface reservoir to withdraw the fluids which have been filtered and treated by microbes present in the subsurface reservoir, wherein the recovery wells are fitted with pressure monitoring equipment that can be monitored remotely; (e) adjusting water quality parameters to meet specific demands of a user through a post-recovery storage/treatment system; and (f) transporting water to a hydraulic fracturing site through a distribution system. Pretreatment to remove oils, solids and adjust pH to reduce wear and tear on pumps may be implemented at the onset. A water storage system may also be implemented to regulate flow into the injection well. Specialized equipment to monitor flow and pressure which can be monitored remotely may also be installed at the pre-injection point and water recovery wells. Water storage and water treatment equipment may be placed after the recovery well point to adjust water quality parameters to meet specific conditions to meet user requirements. A distribution network to transfer the final product can be put in place. Also, infrastructure where trucks can load/unload to take/bring water to the facility can be implemented.

The source of fluid can be fresh water, salt water, recycled frac water, or any fluid that is desired to be stored. In an example, the process and system of the present disclosure is provided to clean and recover used frac fluid or water. The fluid is pumped into the ground through an injection well to a subsurface where it is filtered. Undesired components are removed from the fluid during the filtering which is then collected at a recovery well positioned at a predetermined distance from the injection well. The cleaned or filtered fluid/water is then pumped back to the surface to be used for any intended purposed including hydraulic fracturing if needed.

The fluids can then be treated in a pre-injection treatment phase. This step is useful to recover oil that may exist in the fluid prior to being cleaned or recycled. The fluids that are recovered through a recovery well can be treated through a post-recovery storage/treatment to meet specific demands of a user. This can include adjusting water quality parameters. This can include adjusting pH or level of purity. An adjustment would include adding chemicals or cleaning agents.

Figure 1:
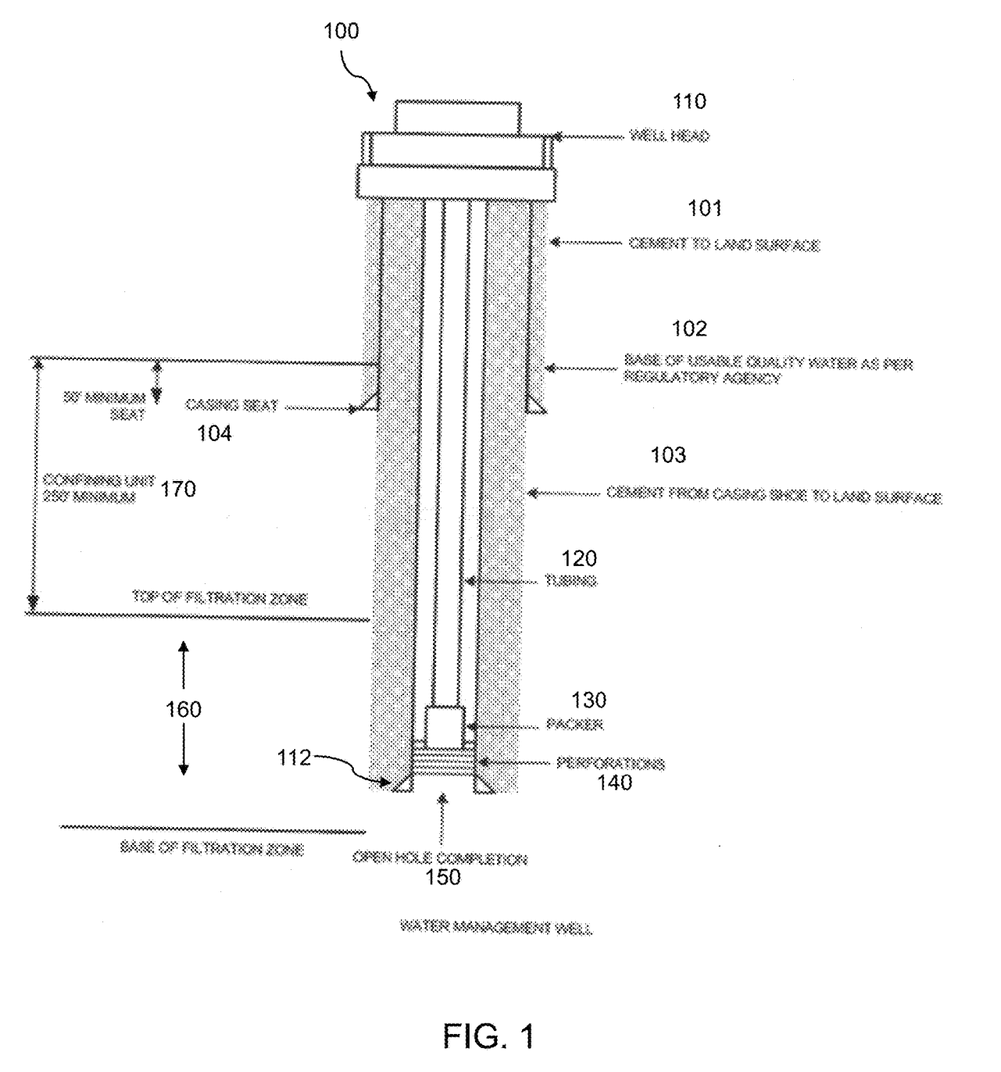
FIG. 1 illustrates a schematic example of a water management well according to the present disclosure.
Figure 2:
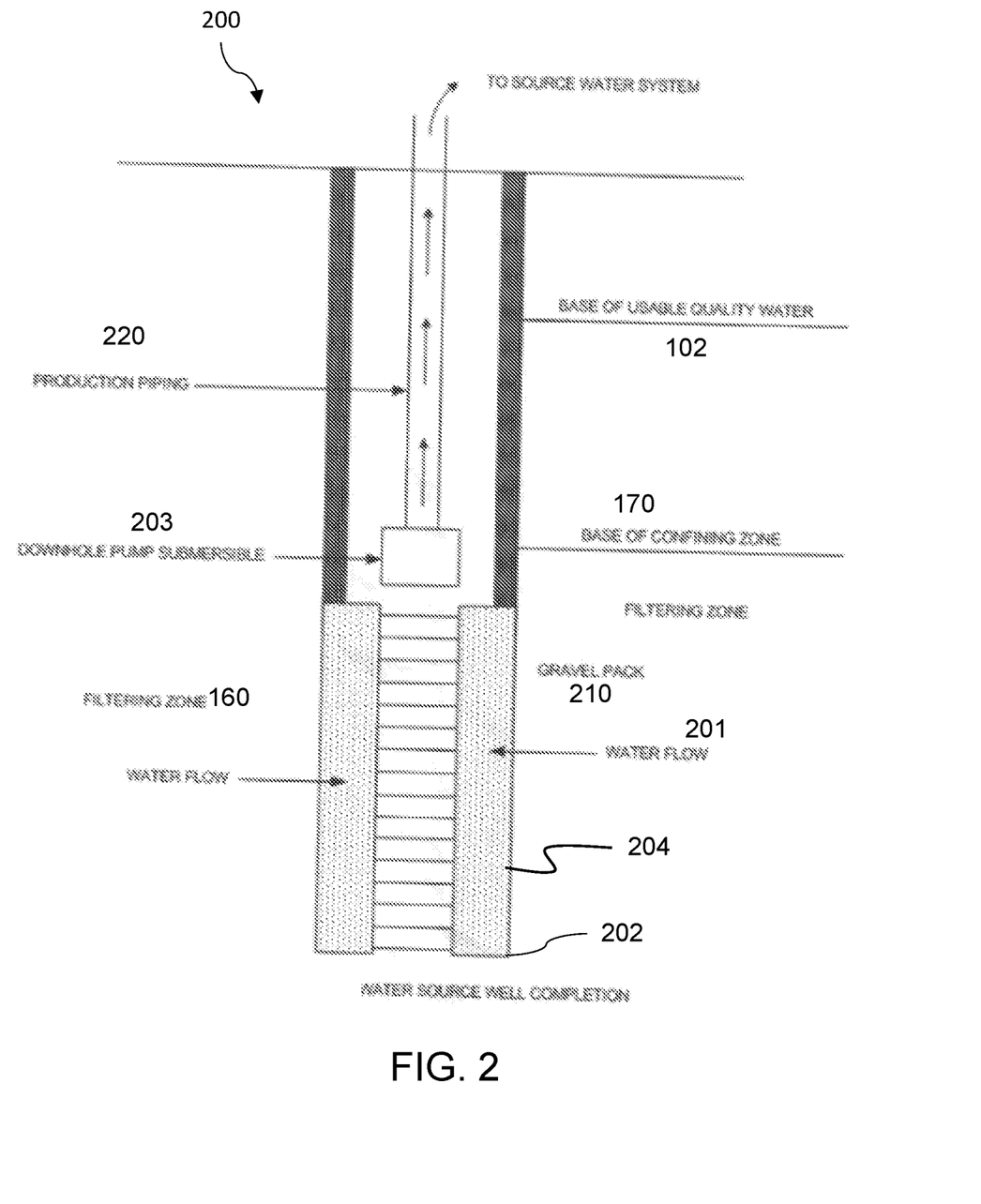
FIG. 2 illustrates an example of a water source well completion.

FIG. 1 illustrates an example water management well (injection well) 100. Water management well 100 includes a well head 110 connected to vertical tubing 120 that extends downwardly into the ground from the land surface through cement 101, beyond a base level for usable water 102 (defined as a limit for quality water per a regulatory agency) and a confining unit (a layer of rock or soil of very low hydraulic conductivity that hampers the movement of groundwater in and out of an aquifer) and through cement casing shoe 103 that extends to land surface from a casing seat 104. Frac and produced water is injected down the water management well or an injection well 100, down tubing 120 and below a packer 130 through perforations 140 and/or an open hole 150 defined at a bottom 112 of the well 110 into a filter zone 160 or reservoir. The frac/produced water enters the filter zone 160 well below a lowest most source of drinking water (base 102) or protected aquifer and at least 250 feet of confining units (impermeable material such as shale). The well is cased and cemented back to surface via the casing shoe 103 with at least two strings of pipe that are compatible with formations and injected fluids. The injected fluids exit out the perforations 140 and the open hole 150 interval into the filtering reservoir 160 and the impurities in the injected fluids are trapped by the reservoir 160. The water migrates to a source well 200 which is depicted in FIG. 2. Actual setting depths are based on local geologic conditions and regulatory requirements.

FIG. 2 illustrates an example completion method for a source or recovery well 200 for filtered water that was injected down a water management or injection well 100 and has migrated through the filter zone 160 or reservoir and is now free of undesired impurities. Water flow 201 enters the source well 200 through a gravel pack 210 and flows through a screen 202 and up into a casing 204 where a submersible pump 203 carries the fluid 201 upward to a pipe 220 of various types of construction materials suitable to handle the chemistry of the water. From the source well 200, the water goes to a collection system shown in subsequent figures in this application. Source well 200 has casing 204 to protect usable quality groundwater and protected aquifers which occur at various depths. The casing 204 and cement extend to the filtering reservoir 160 and have at least 250 feet of confining units (such as shale) between the usable quality water and the filtering reservoir 160. Actual depths are dependent upon local geologic conditions and regulatory requirements.

Figure 3:
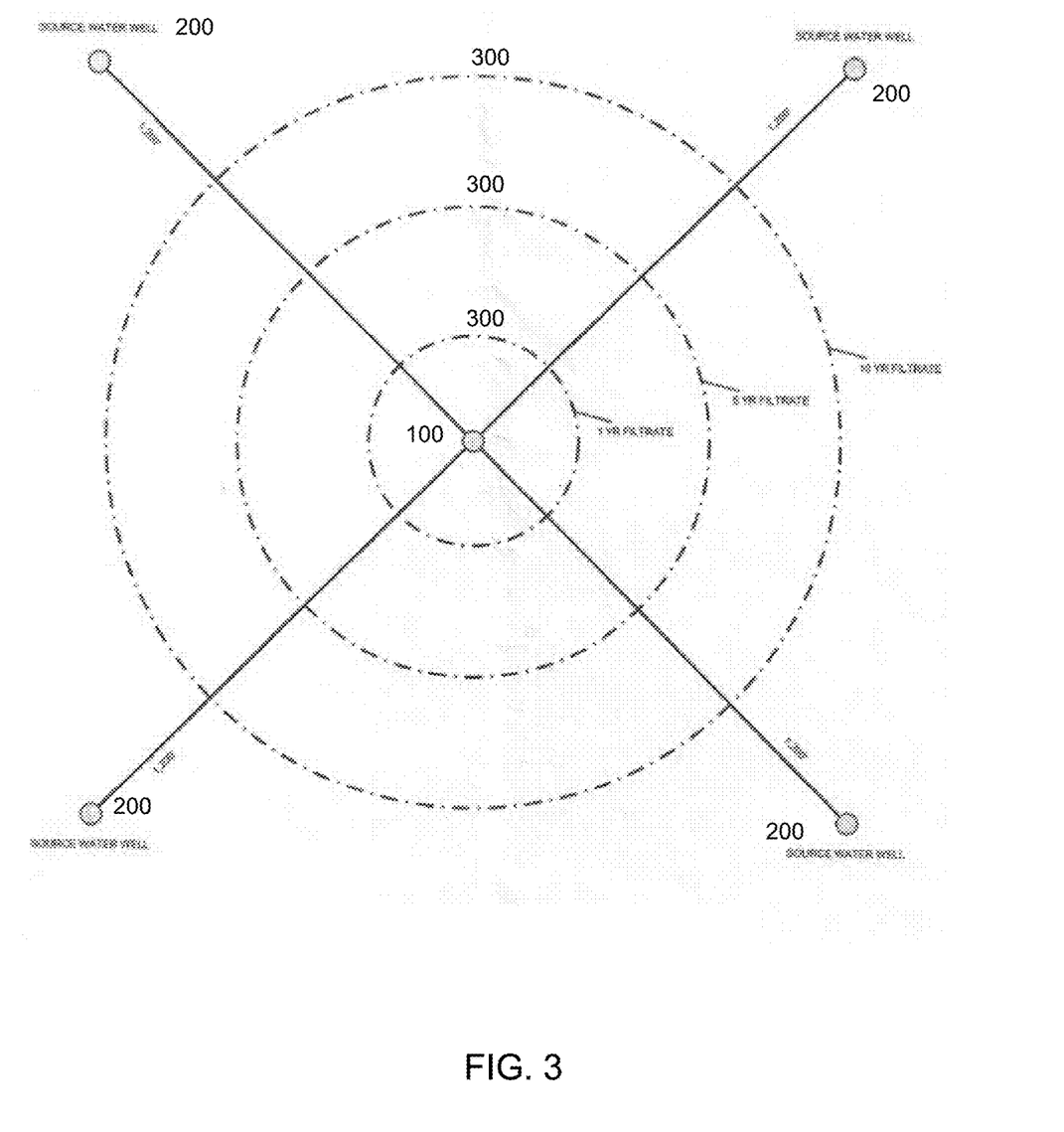
FIG. 3 illustrates a schematic example of a water management well with postulated filtrate capture toward source wells.

FIG. 3 is a schematic top level (aka, a bird's eye view) of a water management well or injection well 100 in a center with four source wells 200 surrounding the water management well or injection well 100. In this example, four source wells 200 are provided and spaced evenly surrounding injection well 100. Additional source wells 200 can be added around the water management well 100 if desired based on reservoir parameters. Concentric rings 300 are shown to represent accumulation of filtered material over time; however, the filtered sediments may not accumulate concentrically, but may take on various shapes dependent on anisotropy and heterogeneity of a given reservoir. This illustration is to depict that build-up of filtrate will accumulate over time.

Figure 4:
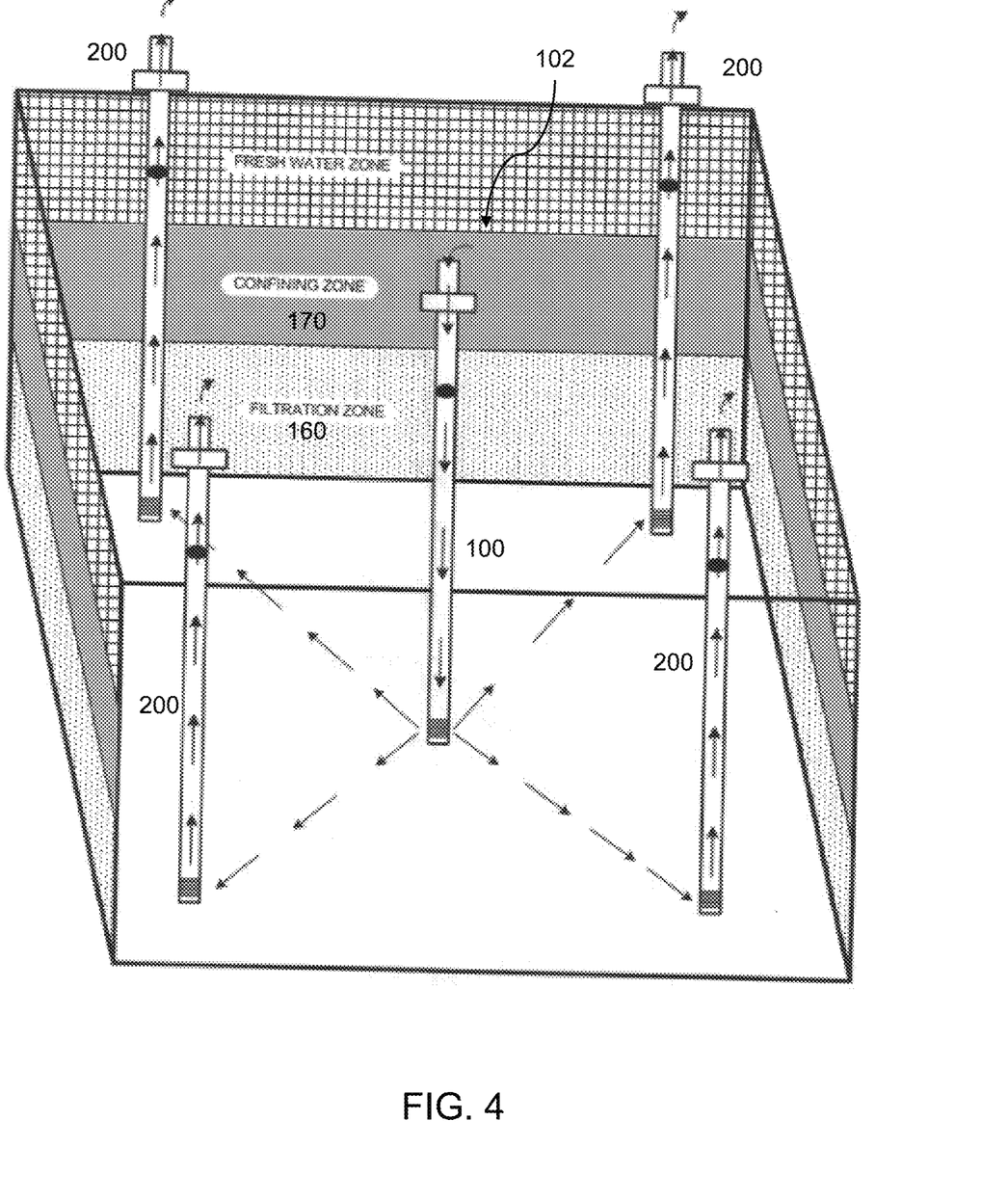
FIG. 4 illustrates a water management well with four source wells depicting postulated water flow through filtering zone.

FIG. 4 is a three-dimensional schematic of fluid flow down a water management well 100 and flow toward the source wells 200 without a filtrate being shown. Note the protected fresh water zones are isolated by a confining zone 170 and the filtration zone 160 is below the confining units 170. As the fluids is injected down the water management well 100, the fluid migrates toward the source wells 200 due to the source wells pumping water out of them, creating a differential pressure gradient toward the pumping source wells 200. As the process is ongoing the filtering zone 160 removes the undesirable characteristic of the injected fluid.

Figure 5:
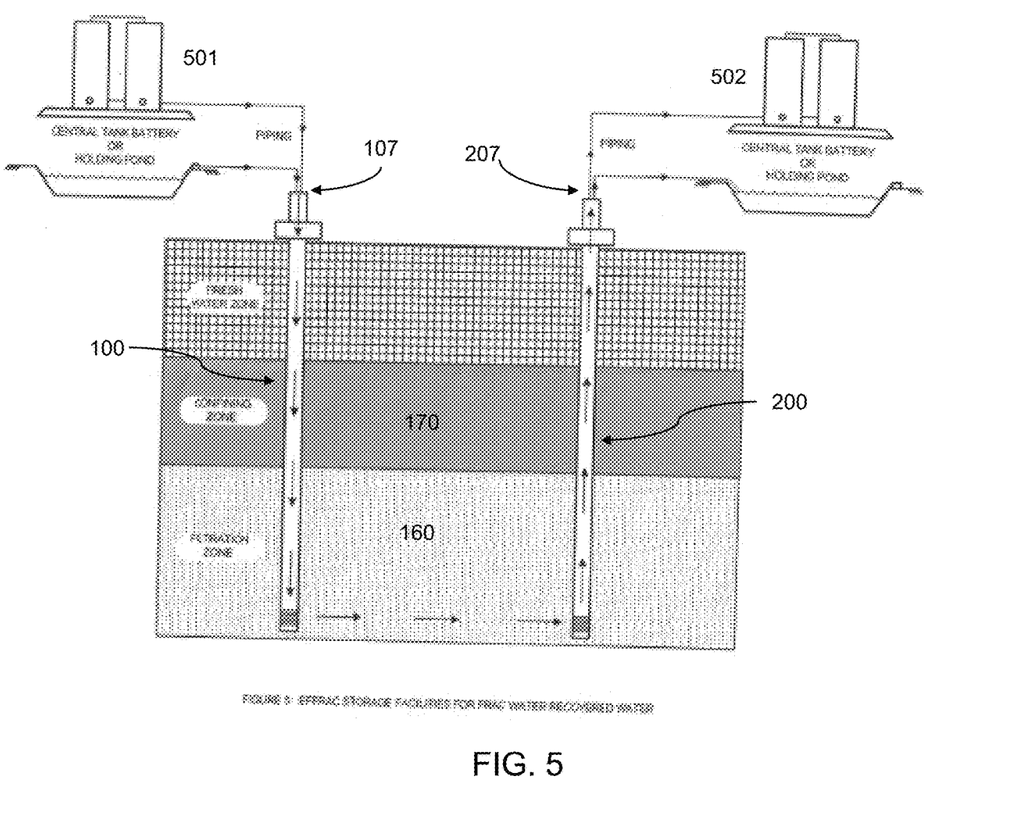
FIG. 5 illustrates an example schematic of frac/produced water being injected into filter one and being recovered from a filter zone as source water.

FIG. 5 illustrates a cross-sectional view how the fluid is injected down the water management well 100 into the filtering zone 160 and migrates toward the source well 200 which is pumping fluid from the filtering zone 160. There are storage facilities 501 and 502 at the injection point 107 and source water removal point 207 to regulate and balance flow into the filtering zone 160. Pressure monitoring and flow control are affixed at the injection facility 501 and source water facility 502 to monitor operations. Note at all times there is a minimum of 250 feet of confining units 170 between the protected aquifers and the filtering zone 160.

Figure 6:
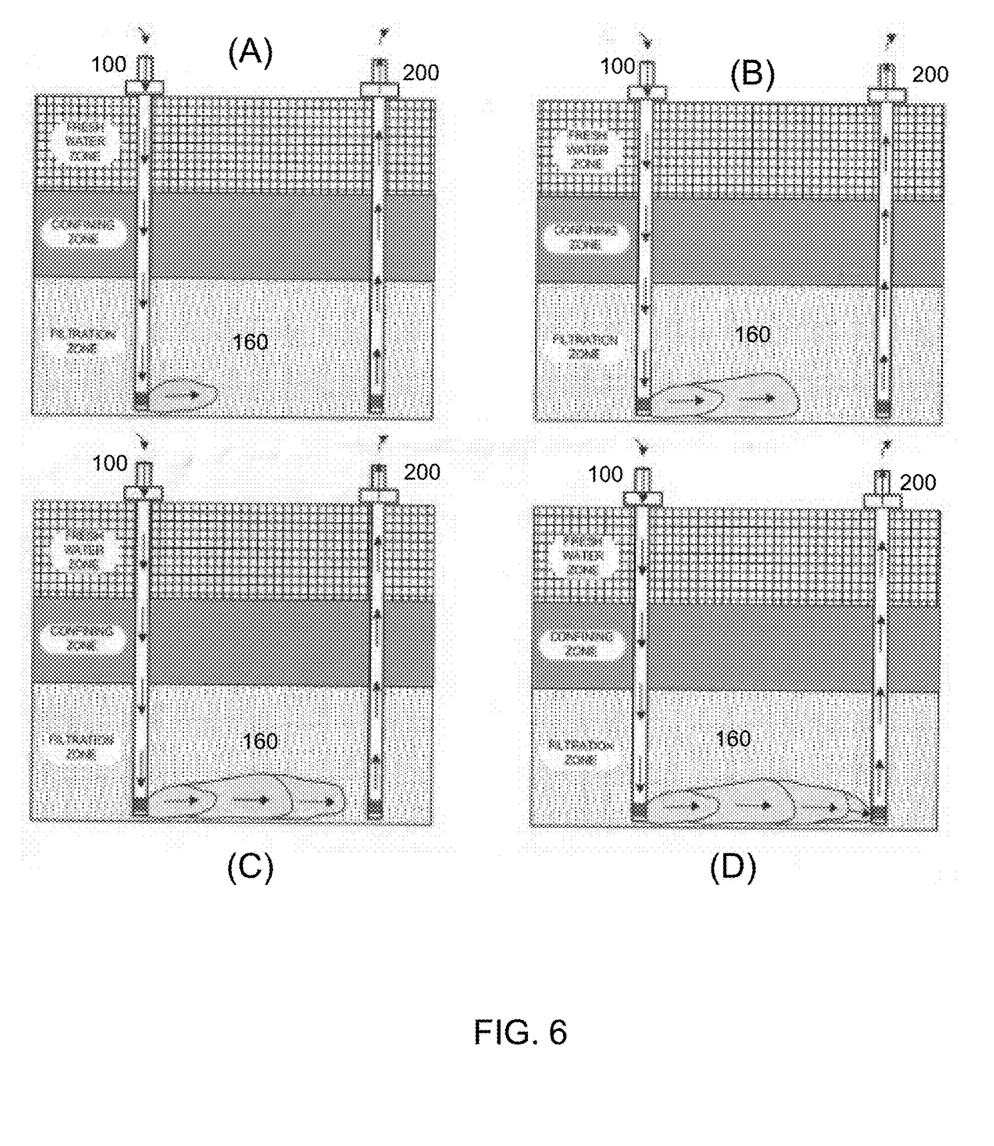
FIG. 6 illustrates a schematic of how frac and produced water are cleaned in the filtering zone over time and recovered in the source well.

FIG. 6 is a cross-section between a water management well 100 and source water well 200 that illustrates how the filtering zone 160 captures undesired impurities from the injected fluids over time from (A) to (B) to (C) to (D). The impurities will actually gather radially around the water management well 100 and slowly move outward toward the source well 200 over time.

The present disclosure further provides for an example system that includes at least one injection well 100 and at least one recovery well 200. Each of the injection wells 100 and recovery wells 200 include pressure and flow monitoring equipment that can be monitored and adjusted remotely. In another example, the flow and pressure is adjusted through an automated system when the system reaches or surpasses a preset threshold. The recovered fluid resulting from the filtering through the filter zone 160 and up through recovery well 200 can be transported to a variety of uses including back to a fracking facility for recycled use. The management, storage, and transport of the recovered fluid can be performed remotely and automated.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A method of recycling hydraulic fracturing fluid comprising:
    (a) providing a source of hydraulic fracturing fluids with a storage system to hold the fluids;
    (b) treating the fluids in a pre-injection treatment step;
    (c) providing an injection well and pumping system to place the fluids in a porous and permeable subsurface reservoir;
    (d) allowing the fluid to be filtered within a filtering zone formed in the subsurface reservoir;
    (e) placing at least one recovery well and pump in the subsurface reservoir at a predetermined distance from the injection well; and
    (f) withdrawing the filtered fluids through the recovery well, wherein the fluid has been filtered and treated by microbes present in the subsurface reservoir;

wherein the filtering zone formed in the subsurface reservoir is located at a sufficient depth below a fresh water zone and confining zone.

2. The method of claim 1, further comprising adjusting water quality parameters to meet specific demands of a user through a post-recovery storage/treatment system.

3. The method of claim 1, further comprising transporting water to a hydraulic fracturing site through a distribution system.

4. The method of claim 1, wherein the pre-injection treatment is performed in a pretreatment facility prior to injecting the fluid, wherein the pre-injection treatment step performs at least one of the following tasks selected from the group consisting of removing oils and/or solids; and adjusting pH to reduce wear and tear on pumps.

5. The method of claim 1, further comprising regulating flow into the injection well through a water storage system.

6. The method of claim 1, further comprising monitoring flow and pressure of the injection well and the recovery well through specialized equipment.

7. The method of claim 6, wherein the monitoring is performed remotely.

8. The method of claim 1, further comprising water storage and water treatment equipment placed after the recovery well to adjust water quality parameters to meet specific conditions to meet user requirements.

9. The method of claim 1, further comprising transferring a final product from the recovery well through a distribution network.

10. The method of claim 1, wherein the injection well is fitted with pressure monitoring equipment that can be monitored remotely.

11. The method of claim 1, wherein the at least one recovery well is fitted with pressure monitoring equipment configured to be monitored remotely.

12. The method of claim 1, wherein the injection well is surrounded by a plurality of recovery wells positioned at predetermined distances from the injection well.

13. The method of claim 12, wherein four recovery wells are positioned equidistant from the injection well evenly spaced around the injection well.

14. The method of claim 12, wherein the plurality of recovery wells are each positioned at least 1000 feet away from the injection well.

15. A hydraulic fracturing fluid recycling system comprising:
 (a) a storage system to hold a source of hydraulic fracturing fluids;
 (b) an injection well and pumping system to place the fluids in a porous and permeable subsurface reservoir;
 (c) a filtering zone formed in the subsurface reservoir, wherein the fluids are filtered and treated by microbes present in the subsurface reservoir; and
 (d) at least one recovery well and pump positioned in the subsurface reservoir at a predetermined distance from the injection well; and
 wherein the filtered fluids are recovered through the recovery well and stored in a storage facility;
 wherein the filtering zone formed in the subsurface reservoir is located at a sufficient depth below a fresh water zone and confining zone.

16. The hydraulic fracturing fluid recycling system of claim 15, further comprising a post-recovery storage/treatment system configured for adjusting water quality parameters to meet specific demands.

17. The hydraulic fracturing fluid recycling system of claim 15, further comprising a distribution system configured for transporting water to a hydraulic fracturing site.

18. The hydraulic fracturing fluid recycling system of claim 15, further comprising a water storage system configured for regulating flow into the injection well.

19. The hydraulic fracturing fluid recycling system of claim 15, further comprising a pre-injection treatment configured to be performed in a pretreatment facility prior to injecting the fluids, wherein the pre-injection treatment performs at least one of the following tasks selected from the group consisting of removing oils and/or solids; and adjusting pH to reduce wear and tear on pumps.

20. The hydraulic fracturing fluid recycling system of claim 15, further comprising specialized monitoring equipment configured for monitoring flow and pressure of the injection well and the recovery well.

* * * * *